US006388673B1

(12) United States Patent
Egan (10) Patent No.: US 6,388,673 B1
(45) Date of Patent: May 14, 2002

(54) METHOD AND SYSTEM FOR FILTER TYPE APPROXIMATION IN COMPUTER GRAPHICS PROCESSING

(75) Inventor: Kenneth William Egan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/409,447

(22) Filed: Sep. 30, 1999

(51) Int. Cl.[7] .................... G06T 11/00; G06T 11/40; G06K 9/32
(52) U.S. Cl. ................. 345/581; 345/589; 345/596; 345/606; 345/643; 345/549; 358/525; 358/526; 358/300; 382/293; 382/300
(58) Field of Search ................. 345/418, 429, 345/430, 431, 581, 586, 589, 590, 591, 593, 597, 596, 601, 606, 608–610, 616, 64, 643, 549, 547; 358/525, 526, 428; 382/276, 293, 300, 298, 299, 302, 304

(56) References Cited

U.S. PATENT DOCUMENTS 5,400,371 A * 3/1995 Natarajan ............... 375/122
6,016,152 A * 1/2000 Dickie ..................... 345/436
6,018,592 A * 1/2000 Shinagawa ............... 382/195
6,057,800 A * 5/2000 Yang ................... 342/357.08
6,102,221 A * 8/2000 Habisohn ................. 212/270
6,130,674 A * 10/2000 Vaswani .................. 345/430
6,181,347 B1 * 1/2001 Devic .................... 345/430
6,188,803 B1 * 2/2001 Iwase .................... 382/300
6,191,793 B1 * 2/2001 Piazza .................... 345/430

* cited by examiner

Primary Examiner—Matthew Luu
Assistant Examiner—Wesner Sajous
(74) Attorney, Agent, or Firm—Duke W. Yee; Mark E. McBurney; Michael R. Nichols (57) ABSTRACT

A method and system for an approximation of a filter function for computing a characteristic value of an output pixel based on characteristic values of a plurality of input pixels is provided. A filter response curve adjustment value is obtained, preferably from a lookup table, based on a distance interval between coordinates of the output pixel and coordinates of a selected input pixel. A normalized filter response curve input value is computed based on the distance interval and the filter response curve adjustment value, preferably by adding the values together. The characteristic values at a plurality of input pixels are obtained. A linearly interpolated value for the characteristic value of the output pixel is then computed based on the characteristic values of the plurality of input pixels and the normalized filter response curve input value.

27 Claims, 9 Drawing Sheets

METHOD AND SYSTEM FOR FILTER TYPE APPROXIMATION IN COMPUTER GRAPHICS PROCESSING

BACKGROUND OF THE INVENTION

1. Technical Field

The present invention relates to an improved data processing system and, in particular, to a method and system for computer graphics processing system, specifically, for adjusting the surface detail/characteristic of a computer-based image.

2. Description of Related Art

Digital image processing is computationally expensive. Data processing systems usually contain several performance enhancements for increasing the speed at which digital images can be processed, but these enhancements are generally accompanied by quality tradeoffs. It can be a challenge to increase the performance of the image processing operations while still producing acceptable quality images.

The efficiency of the image filters is one factor affecting the efficiency of a data processing system. Image filtering is performed during a variety of computer graphics-related functions. For example, texture filtering involves averaging the colors of surrounding texels, i.e. one picture element from a texture map, to determine the texture color of a resulting pixel. Filtering techniques can reduce blockiness when the image is zoomed in and can reduce speckling when the image is zoomed out.

Bilinear filtering is one of the more common approaches for smoothing a resulting image. Linear interpolation finds intermediate values by applying a fixed value change for a fixed step size. Bilinear interpolation applies this process in two dimensions. For example, bilinear interpolation may be used to find texture values at the interior pixels of a primitive, such as a polygon, in which the values are known at the vertices.

Another filtering approach uses the sinc filter, named for the mathematical relation sin(x)/x. This technique adds proportional weighting to each of the sample pixels, whereas bilinear approaches affect the image equally. On the other hand, the speed of a bilinear filter is relatively quick, whereas the evaluation of the sinc function is computationally expensive.

Yet another approach uses a bicubic filter, which is defined by the mathematical function, $2x^3-3x^2+1=(2*x-3)*x*x+1$, which requires 3 multiplications and 2 additions. Multiplications are more expensive than additions, so it is desirable to find a technique that can produce good quality yet reduce the number of multiplications, even if the number of additions is increased slightly. However, due to the nature of human vision, a nonlinear filter, such as sinc or bicubic, produces better results than a bilinear approach.

Therefore, it would be advantageous to enhance the performance of a filtering process by reducing its computational costs compared to standard methods while maintaining similar quality in the resulting images.

SUMMARY OF THE INVENTION

A method and system for an approximation of a filter function for computing a characteristic value of an output pixel based on characteristic values of a plurality of input pixels is provided. A filter response curve adjustment value is obtained, preferably from a lookup table, based on a distance interval between coordinates of the output pixel and coordinates of a selected input pixel. A normalized filter response curve input value is computed based on the distance interval and the filter response curve adjustment value, preferably by adding the values together. The characteristic values at a plurality of input pixels are obtained. A linearly interpolated value for the characteristic value of the output pixel is then computed based on the characteristic values of the plurality of input pixels and the normalized filter response curve input value.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
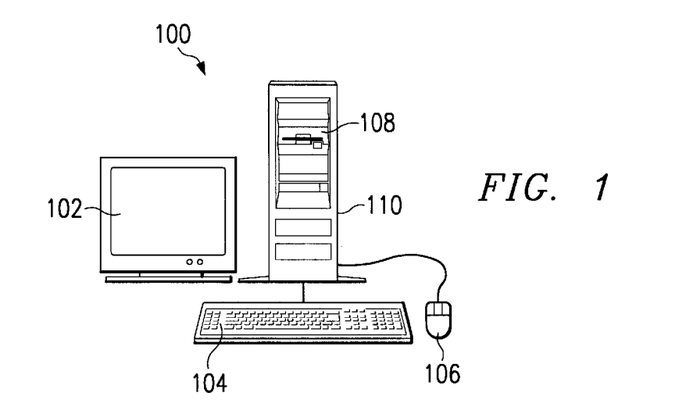
FIG. 1 is a pictorial representation depicting a data processing system in which the present invention may be implemented in accordance with a preferred embodiment of the present invention.

With reference now to FIG. 1, a pictorial representation depicts a data processing system in which the present invention may be implemented in accordance with a preferred embodiment of the present invention. A computer 100 is depicted, which includes a system unit 110, a video display terminal 102, a keyboard 104, storage devices 108, which may include floppy drives and other types of permanent and removable storage media, and mouse 106. Additional input devices may be included with computer 100. Computer 100 can be implemented using any suitable computer, for example, an IBM RISC/System 6000 system, a product of International Business Machines Corporation in Armonk, N.Y., running the Advanced Interactive Executive (AIX) operating system. Although the depicted representation shows a workstation-type computer, other embodiments of the present invention may be implemented in other types of data processing systems, such as network computers, Web-based television set-top boxes, Internet appliances, etc. Computer 100 also preferably includes a graphical user interface that may be implemented by means of system software residing in computer readable media in operation within computer 100.

FIG. 1 is intended as an example and not as an architectural limitation for the present invention.

Figure 2A:
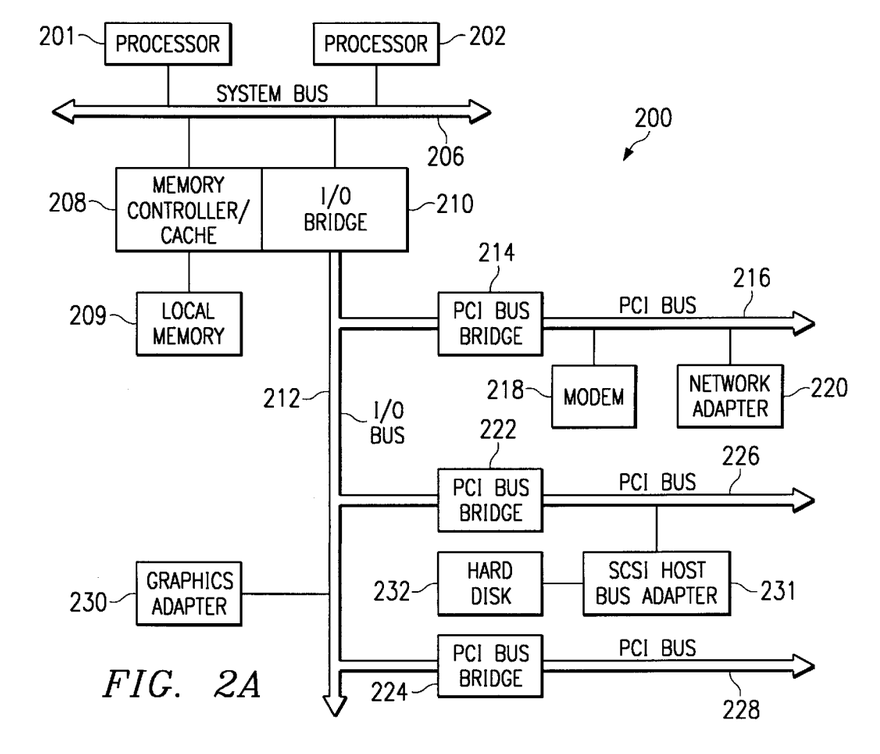
FIG. 2A is an example block diagram illustrating hierarchically organized internal components of a server-type data processing system that may implement the present invention.

With reference now to FIG. 2A, a block diagram depicts hierarchically organized internal components of a server-type data processing system which may implement the present invention. Data processing system 200 may be a symmetric multiprocessor (SMP) system including a plurality of processors 201–202 connected to system bus 206. Processors 201–202 may be any suitable processor, such as a processor selected from the PowerPC family of processors. Memory controller/cache 208, which provides an interface to local memory 209, is also connected to system bus 206. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add-in connectors.

Additional PCI bus bridges 222 and 224 provide interfaces for additional PCI buses 226 and 228, from which additional modems or network adapters may be supported. A memory-mapped graphics adapter 230 may also be connected to I/O bus 212 as depicted, either directly or indirectly. Hard disk 232 may be connected to SCSI Host Bus Adapter 231, which is connected to one of the PCI buses.

Figure 2B:
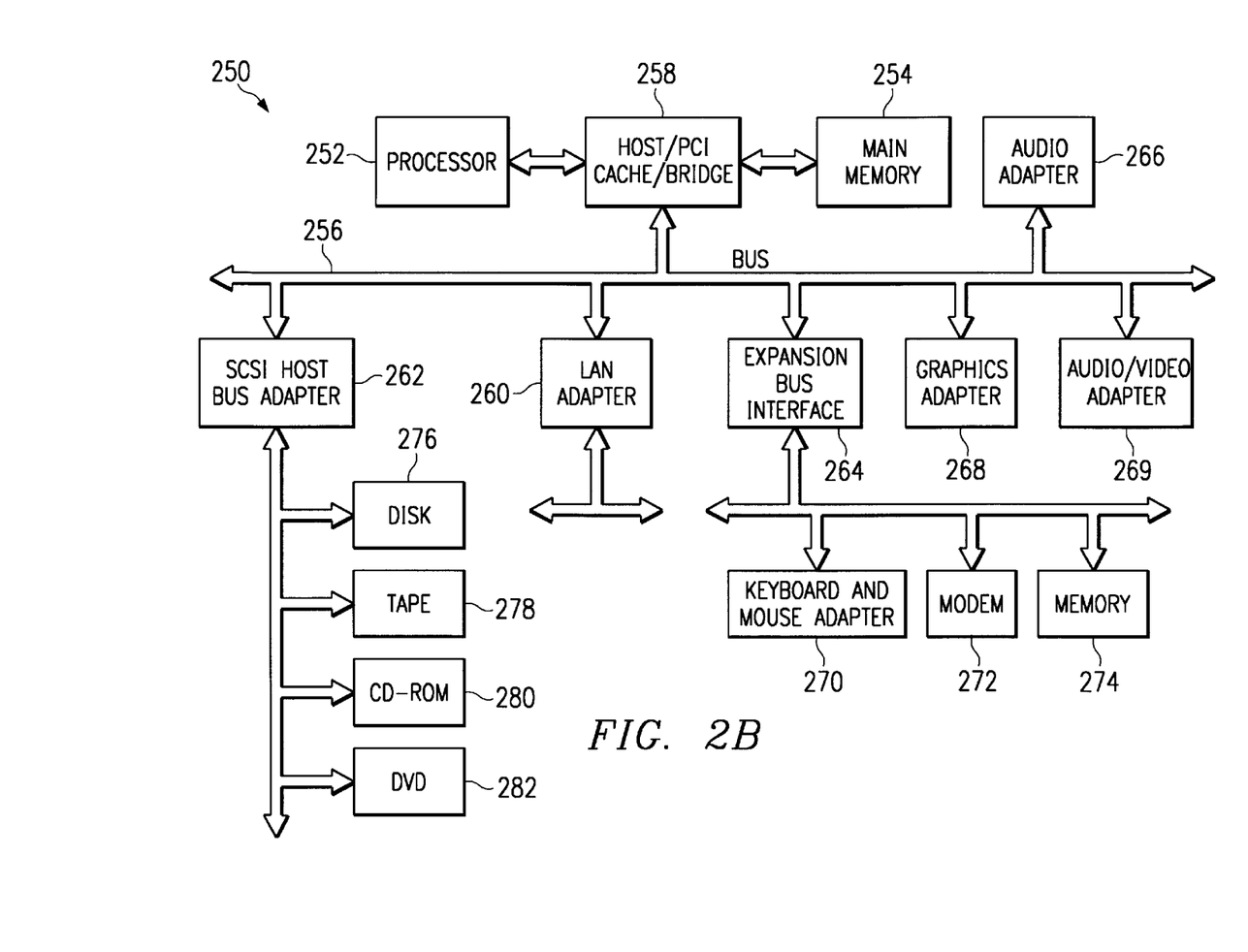
FIG. 2B is an example block diagram illustrating hierarchically organized internal components of a client-type data processing system that may implement the present invention.

With reference now to FIG. 2B, a block diagram depicts hierarchically organized internal components of a client-type data processing system which may implement the present invention. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, and CD-ROM 280 in the depicted example. Typical PCI local bus implementations will support three or four PCI expansion slots or add-in connectors.

An operating system runs on processor 252 and is used to coordinate and provide control of various components within data processing system 250 in FIG. 2B. Instructions for an operating system and applications or programs are located on storage devices, such as hard disk drive 276, and may be loaded into main memory 254 for execution by processor 252. Hard disk drives are often absent and memory is constrained when data processing system 250 is used as a network client.

Those of ordinary skill in the art will appreciate that the hardware in FIG. 2A or FIG. 2B may vary depending on the implementation. For example, other peripheral devices may be used in addition to or in place of the hardware depicted in FIG. 2B. The depicted examples are not meant to imply architectural limitations with respect to the present invention.

The present invention provides an improved filter computation that may be implemented in a graphics card, graphics subsystem, or graphics adapter, such as graphics adapter 268 in FIG. 2B.

With reference now to FIGS. 3A–3F, a series of diagrams depict the computation of a desired pixel value for a pixel in a filtered image space using two known pixel values, or sample pixels, in an original image space in accordance with the present invention. The term "filtered" is used as a generic term in this context because the method of the present invention may be used in a variety of computer-graphics-related operations, such as computing a new image scaled from an original image or in computing a texture mapping for a new image from a prestored texture bitmap.

Figure 3A:
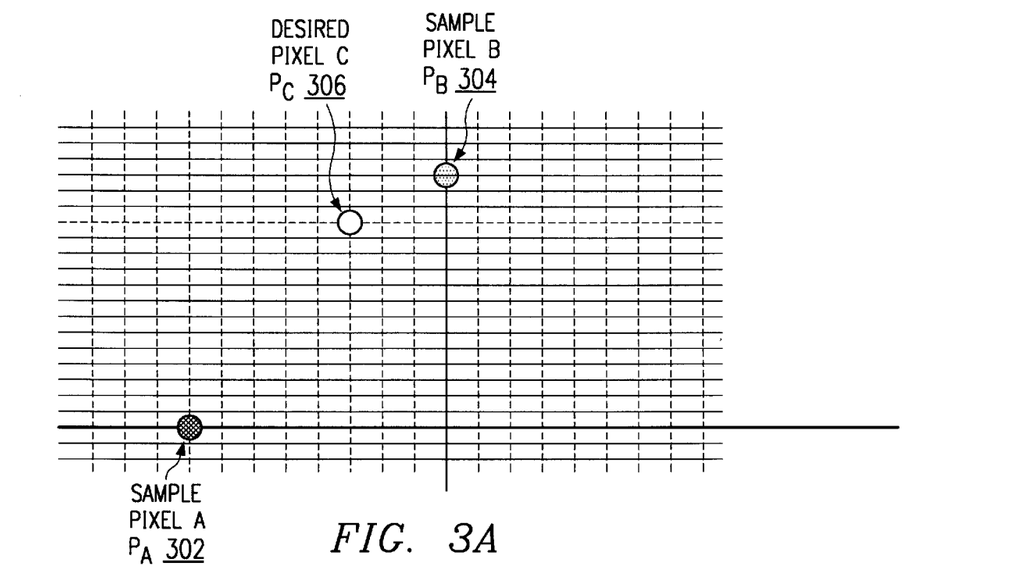
FIGS. 3A–3F are a series of diagrams depicting the computation of a desired pixel value for a pixel in a filtered image space using two known pixel values in an original image space in accordance with the present invention.

FIG. 3A shows sample pixel $P_A$ 302, sample pixel $P_B$ 304, and desired pixel $P_C$ 306. Sample pixel $P_A$ 302 and sample pixel $P_B$ 304 are pixels in an original image, and each pixel is located at coordinate points within the coordinate space of the original image, i.e. each pixel may be described as having a particular spatial relationship appropriate for the resolution of the original image.

The location of desired pixel $P_C$ 306 in the filtered image has been previously computed using an appropriate transformation function for mapping from the original coordinate space to the desired coordinate space. For example, if the original image were being enlarged, then the desired image would have a greater number of pixels than the number of pixels in the original image. If the original image were being reduced, then the desired image would have a lesser number of pixels than the number of pixels in the original image.

The present invention computes an approximate color value for the desired pixel based on the color values of its "neighboring pixels". Some of the desired pixels in the resulting image will be located between the sample pixels in the original image, and a location for a desired pixel is determined before determining the desired pixel's characteristics derived from the characteristics of its nearest "neighboring" pixels in the original coordinate space of the original image. These characteristics may include a color value, and the process is applicable to any "color value" in any color space from RGB to YUV to gray scale.

In the example shown in FIG. 3A, desired pixel $P_C$ 306 lies at a previously determined location between sample pixel $P_A$ 302 and sample pixel $P_B$ 304, and sample pixel $P_A$ 302 and sample pixel $P_B$ 304 have a particular color value. Hence, the following examples describe the manner in which the present invention may be used to compute a color value for desired pixel $P_C$ 306 from the colors of sample pixel $P_A$ 302 and sample pixel $P_B$ 304.

FIG. 3A shows the sample pixels and the desired pixels in a coordinate space of an image in what may be termed "image space". However, in order to determine the characteristic color value of the desired pixel, the computation is performed in a "frequency domain space" as the filter response curve shown in the following figures is more properly considered a frequency filter function and not a spatial function.

Figure 3B:
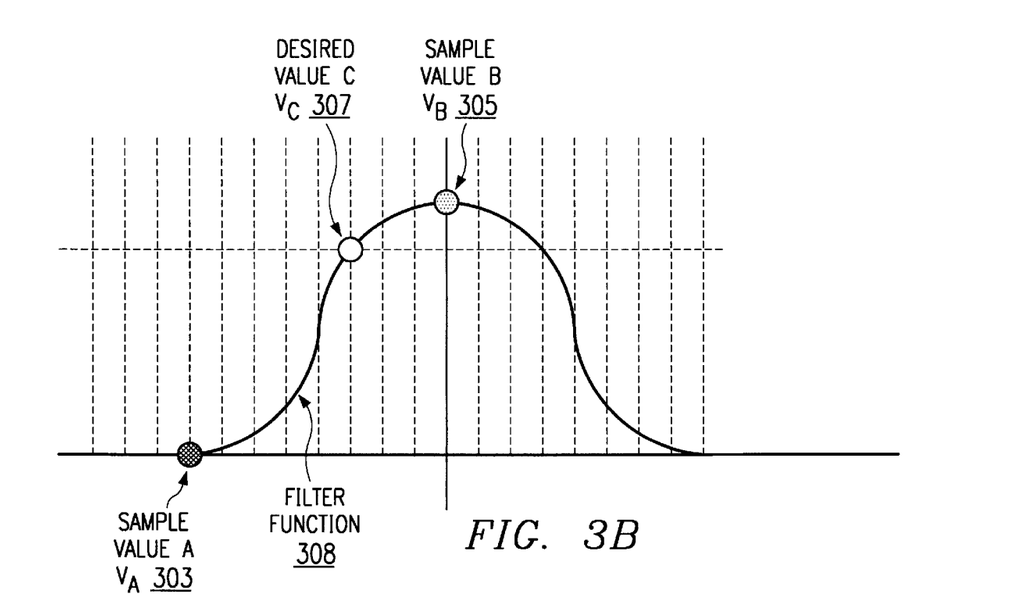

FIG. 3B is similar to FIG. 3A in that FIG. 3B shows sample pixel $P_A$ 302, sample pixel $P_B$ 304, and desired pixel $P_C$ 306. In addition, FIG. 3B shows the addition of filter function 308, which in this case represents the windowed sinc filter function, sin (x)/x, which is approximately symmetric about the y-axis and is symmetric about the vertical axis through its midpoint in each of the quadrants. In a preferred embodiment, the filter function has these features of symmetry which allow the present invention to operate more quickly and efficiently.

To show that FIG. 3B represents a function in a frequency domain space, the term "sample pixel" is replaced by "sample value," and sample pixel $P_A$ 302, sample pixel $P_B$ 304, and desired pixel $P_C$ 306 have been replaced by sample value $V_A$ 303, sample value $V_B$ 305, and desired value $V_C$ 307, respectively.

Ideally, the filter function would be used to determine the characteristic value to be given to the desired value. However, computing the characteristic value with real values with good precision is computationally expensive in hardware, and most general graphics applications do not require it. The human eye is only able to discern a certain amount of detail, especially if the computer-based images are simulating motion, such as the rapid display of successive frames in a video sequence. Hence, the present invention uses an approximation of the filter function.

Figure 3C:
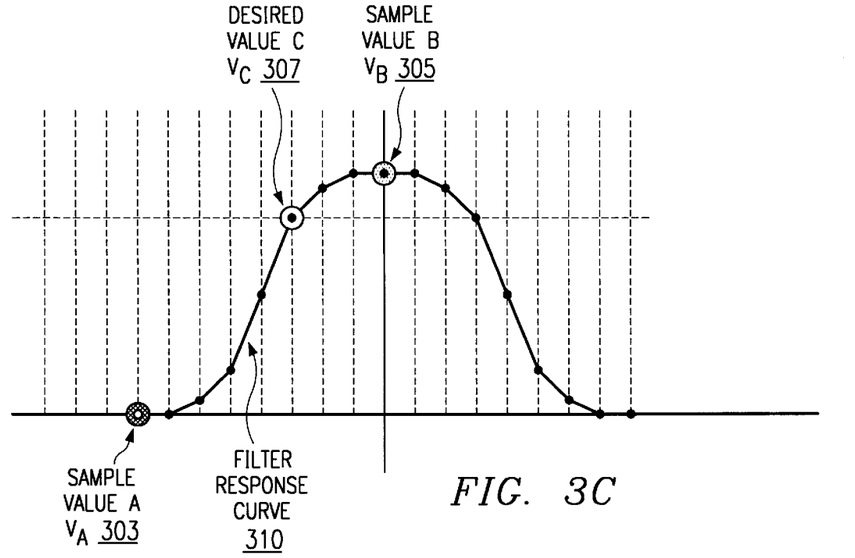

FIG. 3C is similar to FIG. 3B except that filter function 308 has been replaced with filter response curve 310. A filter response "curve" is an approximation to the filter function in which the resulting values of the filter function have been forced through rounding to lie on coordinate values which are easily representable with integer numbers. In other words, the filter function has been aliased, which tends to create a filter response curve that appears boxy because short line segments have replaced the smooth curve of the filter function. Desired value $V_C$ 307 has been slightly "moved" by rounding its coordinates to remain on the approximated filter function, i.e. desired value $V_C$ 307 necessarily lies on filter response curve 310 as its coordinate values are computed so as to lie at particular points in the transformed space.

Figure 3D:
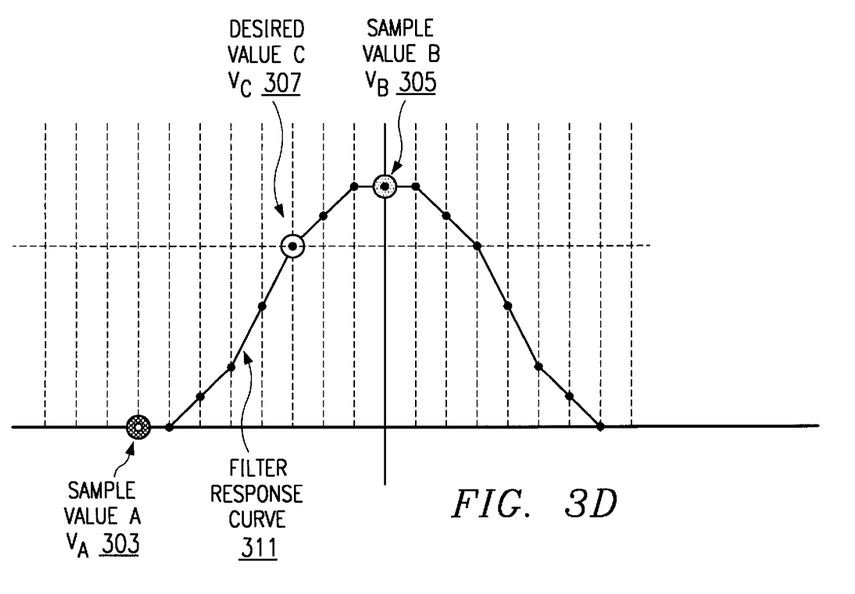
Figure 3E:
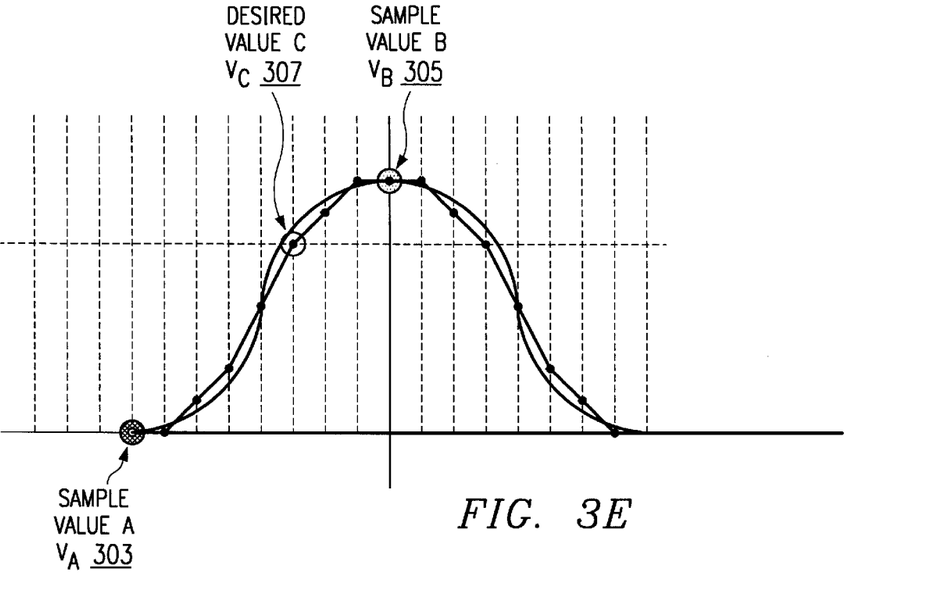

FIG. 3D is similar to FIG. 3C except that filter response curve 310 has been replaced with filter response curve 311. In FIG. 3C, although the filter response curve is shown as being a close approximation of the filter function, the filter response curve has a finer resolution in the y-direction than the x-direction. In FIG. 3D, filter response curve 311 has the same resolution along both the x-direction and the y-direction, which creates a filter response curve that does not approximate the filter function as well as filter response curve 310 but does represent standard computational conditions more accurately. Again, desired value $V_C$ 307 necessarily lies on filter response curve 311 as its coordinate values are computed so as to lie at particular points in the transformed space. The differences between the filter response curve and the filter function can be seen by inspection of FIG. 3E.

Figure 3F:
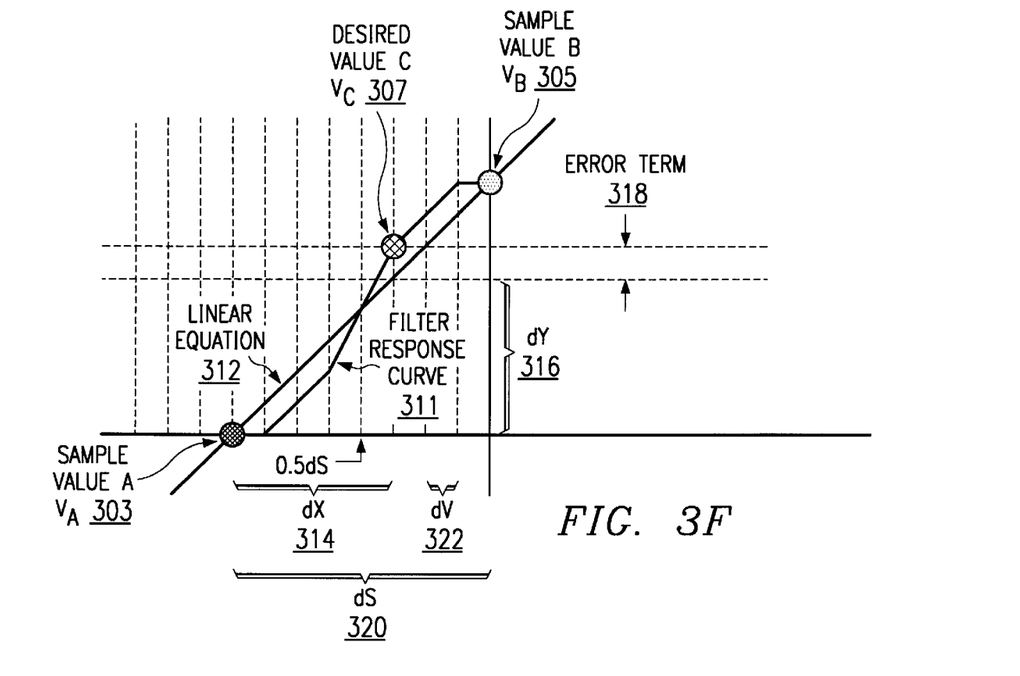

FIG. 3F is similar to FIG. 3D except that several elements related to a line between the sample values are shown. Only the portion of the filter response curve between the sample values is shown.

Linear equation 312 is a standard linear filter function solution. Desired value $V_C$ 307 can be seen to lie on the filter response curve at an interval dX 314 from sample value $V_A$ 303. Linear equation 312 would yield a resulting value dY 316 at an interval dX, i.e. the desired value would be located at (dX,dY), which is not very accurate for desired value $V_C$ 307.

Desired value $V_C$ 307 lies at an interval dX along the x-axis. Distance dS 320 between the sample values is always known because the relationship between sample value $V_A$ 303 and sample value $V_B$ 305 is known, and distance dS can be normalized to one. Hence, an equation for linear equation 312 could be:

$$V_C = V_B * dX + V_A * (1-dX) \qquad (1)$$

where $V_A$ and $V_B$ are the sample values, as shown in FIG. 3F, and $V_C$ is the desired result of the desired value—when dX equals zero, then V' equals $V_A$, and when dX equals one, then $V_C$ equals $V_B$. Rearranging Equation (1) to reduce the number of multiplications, the following equation is obtained for linear equation 312:

$$V_C = (V_B - V_A) * dX + V_A. \qquad (2)$$

Although the linear equation approximation of the filter function is quick and easy to compute, it is not very accurate. To improve the accuracy, error term 318 is added to the resulting value from linear equation 312 in order to provide a closer approximation to the desired value. At each x-coordinate value that may be used as an input to linear equation 312, an error term (or filter response curve adjustment value) may be added to the resulting value from linear equation 312. Hence, the error term is chosen as a function of dX, the interval between the desired value and one of the sample values.

The usable intervals along the x-axis are shown as interval spacing dV 322, and one need only know the value of the error term 318 at these intervals because these are the only potential x-coordinates that may be used as input for the potential locations of any desired pixel for a particular resulting image. The condition is forced to be true through the determination of the coordinates of the desired pixel in the image space of the resulting image. If, using real number calculations with a precise determination of a location, the desired pixel lies between the usable intervals, the result is rounded to fall on one of the usable intervals, and various methods for performing this type of rounding are well-known.

By inspection of the example in FIG. 3F, one can see that there are eight intervals between the two samples. Therefore, as one steps from sample value $V_A$ 303 to sample value $V_B$ 305 in the x-axis direction along linear equation 312 using the interval spacing, one can see that only eight error terms would be necessary for obtaining a filter response curve from the linear equation. Although the error term value for sample value $V_B$ 305 would be zero because it lies on both the filter response curve and the straight line approximation and, hence, would not need to be stored, it is included in the discussion of the general process merely for a complete description of the illustration. Other interval spacing could be implemented depending upon several factors, such as the type of filter function and the accuracy desired within the system.

Again, the filter response curve is approximately symmetric about sample value $V_B$ 305, so only one set of error terms are necessary for determining desired values between pairs of sample values with a given spatial relationship.

Moreover, since the filter response curve is symmetric about 0.5 dS, then even fewer values need to be known because the error term may be added or subtracted based on the location of the desired value on the filter response curve with respect to 0.5 dS.

The error term values may be precomputed and stored in a lookup table. In the example shown in FIG. 3F, only four error term values need to be computed and stored: the error term at x-coordinate value 0.5 dS and the next three error terms at the next three interval values in the positive x-coordinate direction along the x-axis; the other error term values at the other interval values along the x-axis are symmetric about 0.5 dS but have the opposite sign from the stored error terms; and the error term values at the sample points are necessarily zero.

It is not necessary for the filter function to be symmetrical about the vertical axis through its midpoint in each of the quadrants, although in a preferred embodiment, the filter function has this feature of symmetry which allows the system to operate more quickly and efficiently with a lookup table of reduced size. It should be noted that the filter function should be approximately symmetric about the y-axis as this feature allows a lookup table to be computed once for a given resulting image for the following reason—the desired pixel will always lie between two sample pixels that are used to compute the single desired pixel, and the spatial relationship between any two pixels in the original image is known. For example, in FIG. 3F, if sample value $V_A$ were in a positive direction along the x-axis with respect to sample value $V_B$ rather than a negative direction along the x-axis as is shown, the same lookup table values may be used in either case, and this relationship remains true for the entire image or image regions being filtered. Hence, the distance between any two sample pixels is constant and may be normalized when computing the lookup table, which needs to be computed only once.

If, however, a different filtering operation is chosen to produce a different resulting image, even for the same original image, then the lookup table may need to be recomputed as the interval dV may change, which would require the recomputation of the values stored for the filter response curve at the interval points. However, the lookup table needs to be computed only once for the entire image or image region that is being filtered.

Continuing with the discussion of the representation of the filter response curve, a more accurate equation for computing the desired value is:

$$\text{Desired value} = \text{Linear value} +/- \text{an error term}. \quad (3)$$

However, it is assumed that the error terms in the lookup table have been normalized over the full range of the characteristic values of the sample pixels. For example, if sample value $V_A$ has a lowest possible value of 0, and sample value $V_B$ has a highest possible value of 255, then the error terms for the intervals between the sample values are computed on the full range. Hence, the error term must be denormalized, yielding:

$$\text{Desired value} = \text{Linear Value} +/-(\text{Error term} * \text{Scale Factor}). \quad (3a)$$

Since the scale factor is known, i.e. the gradient itself $(V_B-V_A)$, a reasonably accurate equation for computing the desired value is:

$$V_C = (V_B-V_A)*dX + V_A + (V_B-V_A)*\text{ErrorTerm}(dX), \quad (3b)$$

where the error term is a function of the distance along the x-axis for the desired value.

Rearranging Equation (3b) to reduce the number of multiplications, the Equation (4) is obtained:

$$V_C = (V_B-V_A)*(dX + \text{ErrorTerm}(dX)) + V_A. \quad (4)$$

Although the computation of dX would require one or more arithmetic operations, the value of dX would be required as an input to any filter function for the computation of its filter function value. Hence, given a value dX, the present invention is able to compute a reasonably accurate approximation of a filter function value with three additions/subtractions and one multiplication.

This method may be applied to multi-sample filters. However, a different lookup table would be required for each curve approximation as well as multiple linear equation solutions for each pair of sample points. These values would give a course lookup into a lookup table yielding a final error term to be applied to a particular segment. Such an implementation would approximate the bicubic curve.

Figure 4:
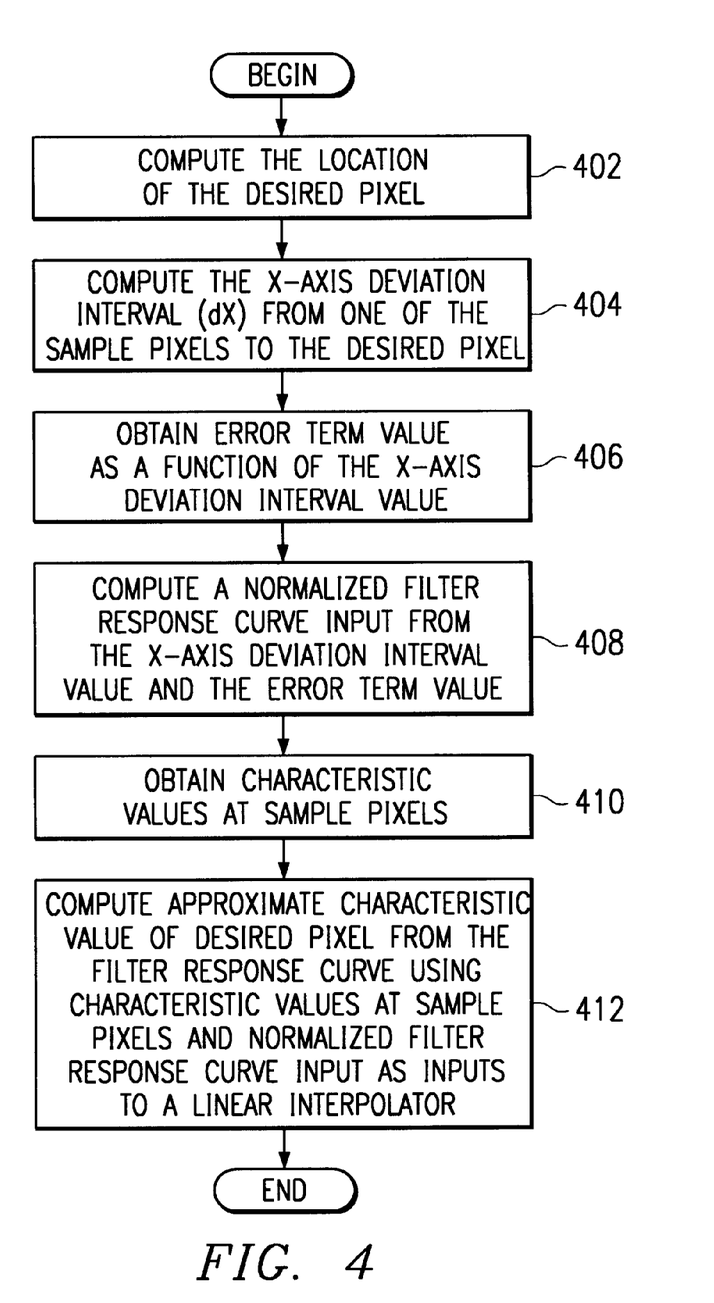
FIG. 4 is a flowchart depicting a process of computing a desired pixel value for a pixel in a filtered image space using two known pixel values in an original image space in accordance with the present invention.

With reference now to FIG. 4, a flowchart depicts a process of computing a desired pixel value for a pixel in a filtered image space using two known pixel values in an original image space in accordance with the present invention.

The process begins by computing the location of the desired pixel (step 402) and then computing the x-axis deviation interval (dX) from one of the sample pixels to the location of the desired pixel (step 404). An error term value that is a function of the x-axis deviation interval value is obtained (step 406), e.g., from a lookup table. A normalized filter response curve input is computed from the x-axis deviation interval value and the error term value (step 408). The characteristic values at the sample pixels are then obtained (step 410). The approximate characteristic value of the desired pixel is computed from the filter response curve using a linear interpolator which uses, as inputs, the characteristic values at the sample pixels and the normalized filter response curve input (step 412). The process is then complete with respect to computing the filtered pixel value, which may then be stored for subsequent display.

Rather than computing the error term as a true function, the present invention uses a lookup table to store the relatively few values that need to be known for a set of error terms that are used to approximate the actual filter curve. The interval value dX may be used as an index into a lookup table to retrieve the error term quickly.

Figure 5:
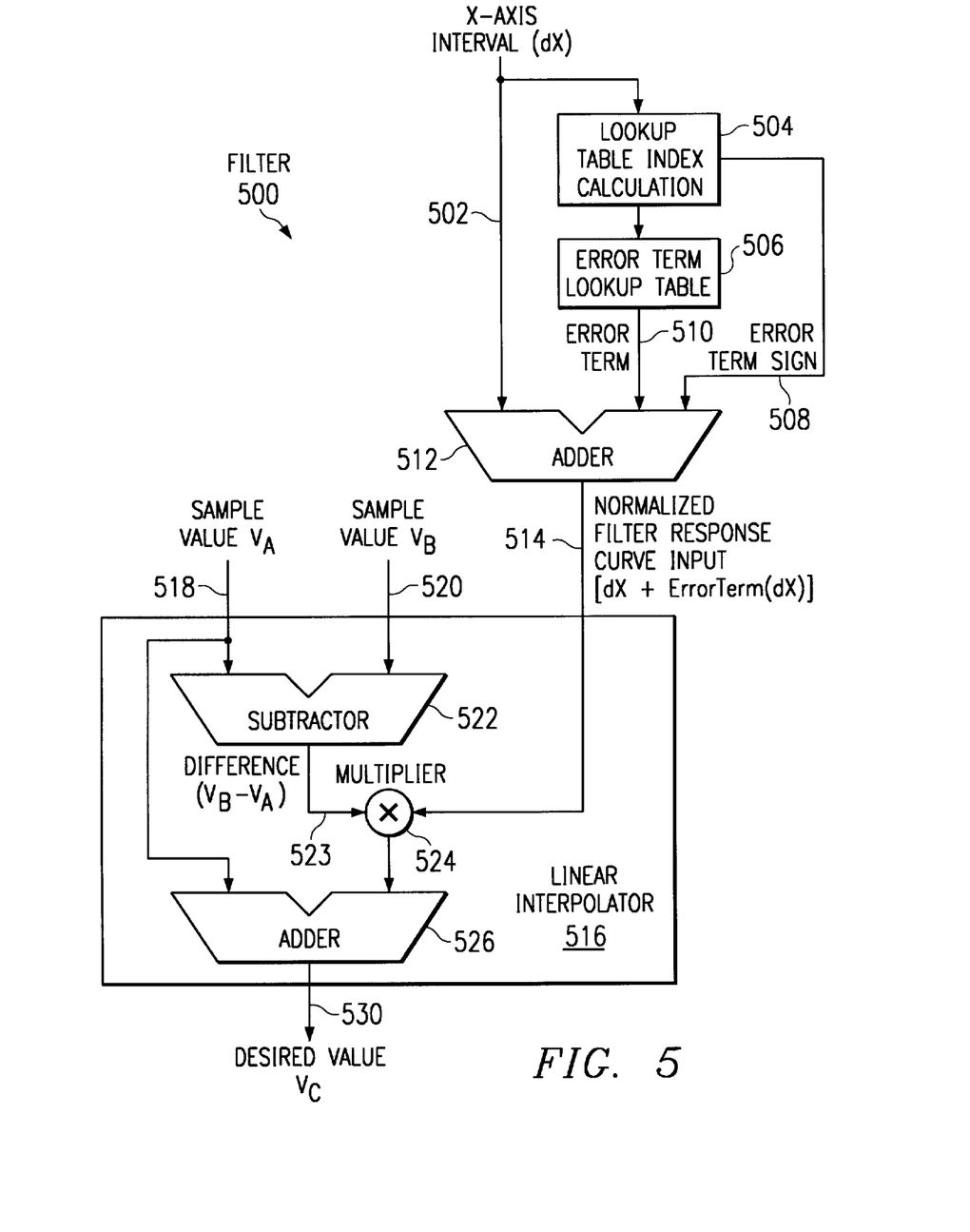
FIG. 5 is a block diagram that shows components that may be used to compute a filtered result for a desired pixel from sample values of sample pixels in accordance with the present invention.

With reference now to FIG. 5, a block diagram shows components that may be used to compute a filtered result for a desired pixel from sample values of sample pixels in accordance with the present invention. Filter 500 may be present in a graphics subsystem or graphics adapter, such as graphics adapter 268 shown in FIG. 2B. Filter 500 accepts x-axis interval (dX) 502, sample value $V_A$ 518, and sample value $V_B$ 520 as inputs.

X-axis interval 502 feeds lookup table index calculation 504 for computing an index into error term lookup table 506. Error term sign 508 is output from lookup table index calculation 504 as a byproduct of the determination of the relationship between x-axis interval 502 and a normalized midpoint value (0.5) between the two sample values. The lookup table index calculation determines where dX lies in relation to the point of symmetry of the filter response curve, which in the example in FIG. 3F is 0.5. If dX is above 0.5, then the lookup entry is (dX−0.5), otherwise it is just dX. This is normalized to correspond to the number of table entries in the lookup table. For example, if dX equals 0.25, and the lookup table has 8 entries, then the index into the lookup table might be equal to 4.

Error term 510 is retrieved from error term lookup table 506 according to the computed index. X-axis interval 502, error term 510, and error term sign 508 are fed into adder 512, which computes the normalized filter response curve input [dx+ErrorTerm(dX)] value (or linear interpolator input value) 514, which is fed into linear interpolator 516.

The values for the lookup table should be generated for a hypothetical Sample A having a characteristic value equal to 0 and a hypothetical Sample B having a characteristic value equal to the full scale value for the pixel. This insures the maximum resolution for the error function. For example, in 24 bit color in which there are 8 bits for each color component red, green, and blue, the maximum value is 255. The number of entries in the lookup table might be 8, whose values would be 0, 2, 4, 2, allowing for symmetry. If the actual characteristic values of the samples were 0 and 255, then the error term values might be either 0, −2, −4, −2, 2, 4, 2.

A difference between sample value $V_A$ 518 and sample value $V_B$ 520 is computed by subtractor 522, and resulting difference value 523 is multiplied with input value 514 by multiplier 524, the result of which is fed into adder 526 along with sample value $V_A$ 518. The output of adder 526 is desired value VC 530, which represents the resulting value of the approximated filter response curve at x-axis interval dX.

The descriptions in the previous examples describe the characteristic value of a sample pixel or a desired pixel as a single numerical value. However, the characteristic to be described at a particular pixel may be represented by more than one numerical value. For example, the color of a pixel may be presented in a color space as a red component value, a green component value, and a blue component value using so-called RGB values. Hence, at each point that a numerical value of a characteristic of a pixel is computed or used as an input, an RGB value must be computed.

Referring back to Equation (4) to the computation of the desired value, $V_C$, at the desired pixel, Equation (4) may be expanded to compute RGB values as follows:

$$R_C=(R_B-R_A)*(dX+\text{ErrorTerm}(dX))+R_A, \quad (5R)$$

where $R_B$ is the red value at sample pixel $P_B$, $R_A$ is the red value at sample pixel $P_A$, ErrorTerm is a lookup table function/value for the error term, and $R_C$ is the red component of the characteristic value at the desired pixel. Similarly, $$G_C=(G_B-G_A)*(dX+\text{ErrorTerm}(dX))+G_A \quad (5G)$$

and $$B_C=(B_B-B_A)*(dX+\text{ErrorTerm}(dX))+B_A \quad (5B)$$

provide the green and blue components of the characteristic value at the desired pixel.

Figure 6:
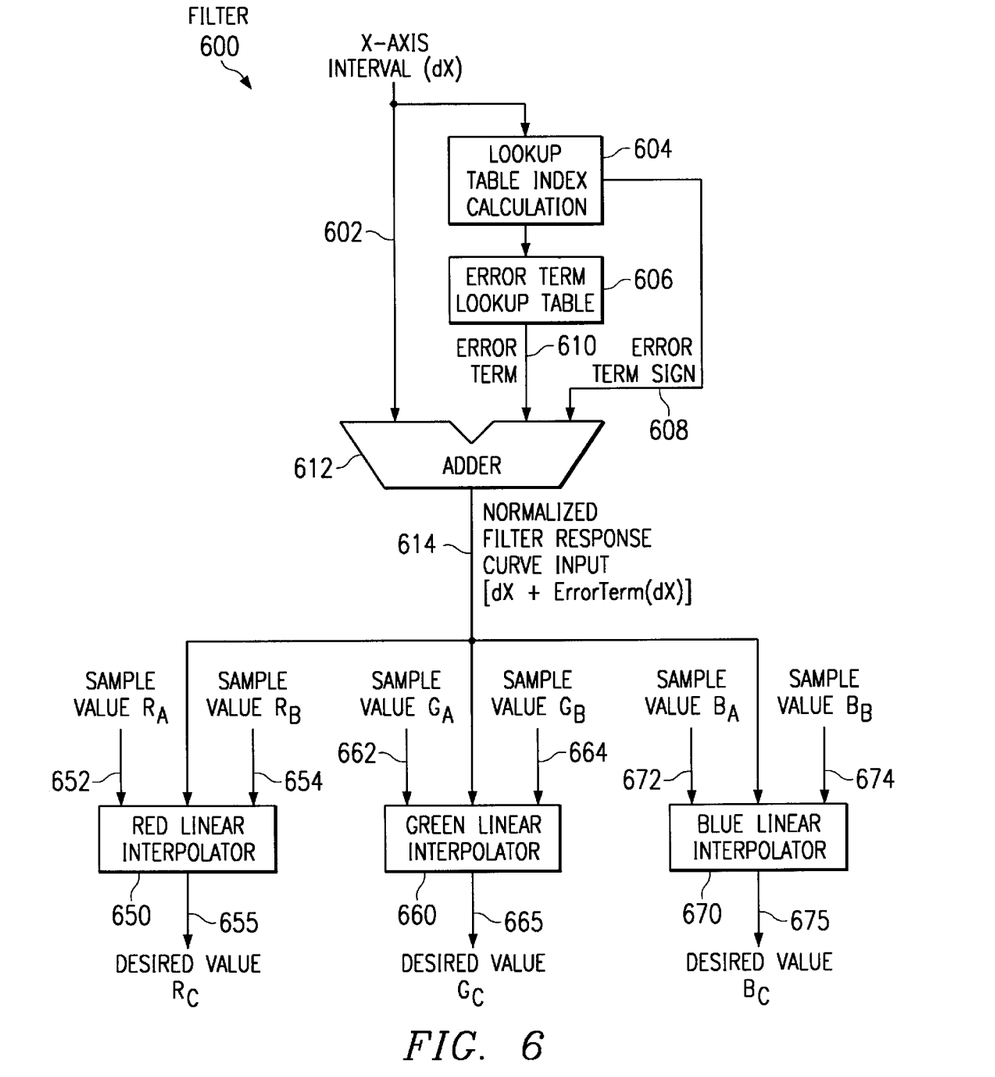
FIG. 6 is a block diagram that show components that may be used to compute a filtered result for a desired pixel from RGB values of sample pixels in accordance with the present invention.

With reference now to FIG. 6, a block diagram shows components that may be used to compute a filtered result for a desired pixel from RGB values of sample pixels in accordance with the present invention. Filter 600 may be present in a graphics subsystem or graphics adapter, such as graphics adapter 268 shown in FIG. 2B. Filter 600 is similar to filter 500 shown in FIG. 5 except that filter 600 operates on multiple characteristic values for a desired pixel. Filter 600 accepts x-axis interval (dX) 602 and RGB values for sample pixel $P_A$ and sample pixel $P_B$ as inputs.

X-axis interval 602 feeds lookup table index calculation 604 for computing an index into error term lookup table 606. Error term sign 608 is output from lookup table index calculation 604 as a byproduct of the determination of the relationship between x-axis interval 602 and a normalized midpoint value (0.5) between the two sample values. Error term 610 is retrieved from error term lookup table 606 according to the computed lookup table index. X-axis interval 602, error term 610, and error term sign 608 are fed into adder 612, which computes the normalized filter response curve input [dX+ErrorTerm(dX)] value 614, which is fed into linear interpolators 650, 660, and 670.

Red linear interpolator 650 accepts normalized filter response curve input value 614 and sample value $R_A$ 652 and sample value $R_B$ 654, the red component of the color values of sample pixel $P_A$ and sample pixel $P_B$, to generate desired value $R_C$ 655, the red component of the color value of desired pixel $P_C$. Green linear interpolator 660 accepts normalized filter response curve input value 614 and sample value $G_A$ 662 and sample value $G_B$ 664, the green component of the color values of sample pixel $P_A$ and sample pixel $P_B$, to generate desired value $G_C$ 665, the green component of the color value of desired pixel $P_C$. Blue linear interpolator 670 accepts normalized filter response curve input value 614 and sample value $B_A$ 672 and sample value $B_B$ 674, the blue component of the color values of sample pixel $P_A$ and sample pixel $P_B$, to generate desired value $B_C$ 675, the blue component of the color value of desired pixel $P_C$. In this manner, the red, green, and blue components of the color value for the desired pixel may be computed in parallel using a single filter response curve with associated error terms stored in a single lookup table.

Referring back to Equation (5), a single filter response curve function is used for a single characteristic of the desired pixel, i.e. color, that has multiple values, i.e. the separate color components red, green, and blue. However, it is possible to have separate filter functions for each characteristic value for the desired pixel. For example, the color value of the desired pixel has separate components, and separate filter functions, and hence, separate filter response curves with separate lookup tables, could be used for each separate component. Therefore, Equation (5) may be expanded as follows:

$$R_C=(R_B-R_A)*(dx+\text{ErrorTerm}_R(dX))+R_A, \quad (6R)$$

where $R_B$ is the red value at sample pixel $P_B$, $R_A$ is the red value at sample pixel $P_A$, $\text{ErrorTerm}_R$ is a lookup table function/value for the red component of the error term, and $R_C$ is the red component of the characteristic value at the desired pixel. Similarly, $$G_C=(G_B-G_A)*(dX+\text{ErrorTerm}_G(dX))+G_A \quad (6G)$$

and $$B_C=(B_B-B_A)*(dX+\text{ErrorTerm}_B(dX))+B_A \quad (6B)$$

provide the green and blue components of the characteristic value at the desired pixel. In this example, three lookup tables would be necessary, one for each of the RGB components of the color value, if each color component were to have a different filter function applied to each.

Figure 7:
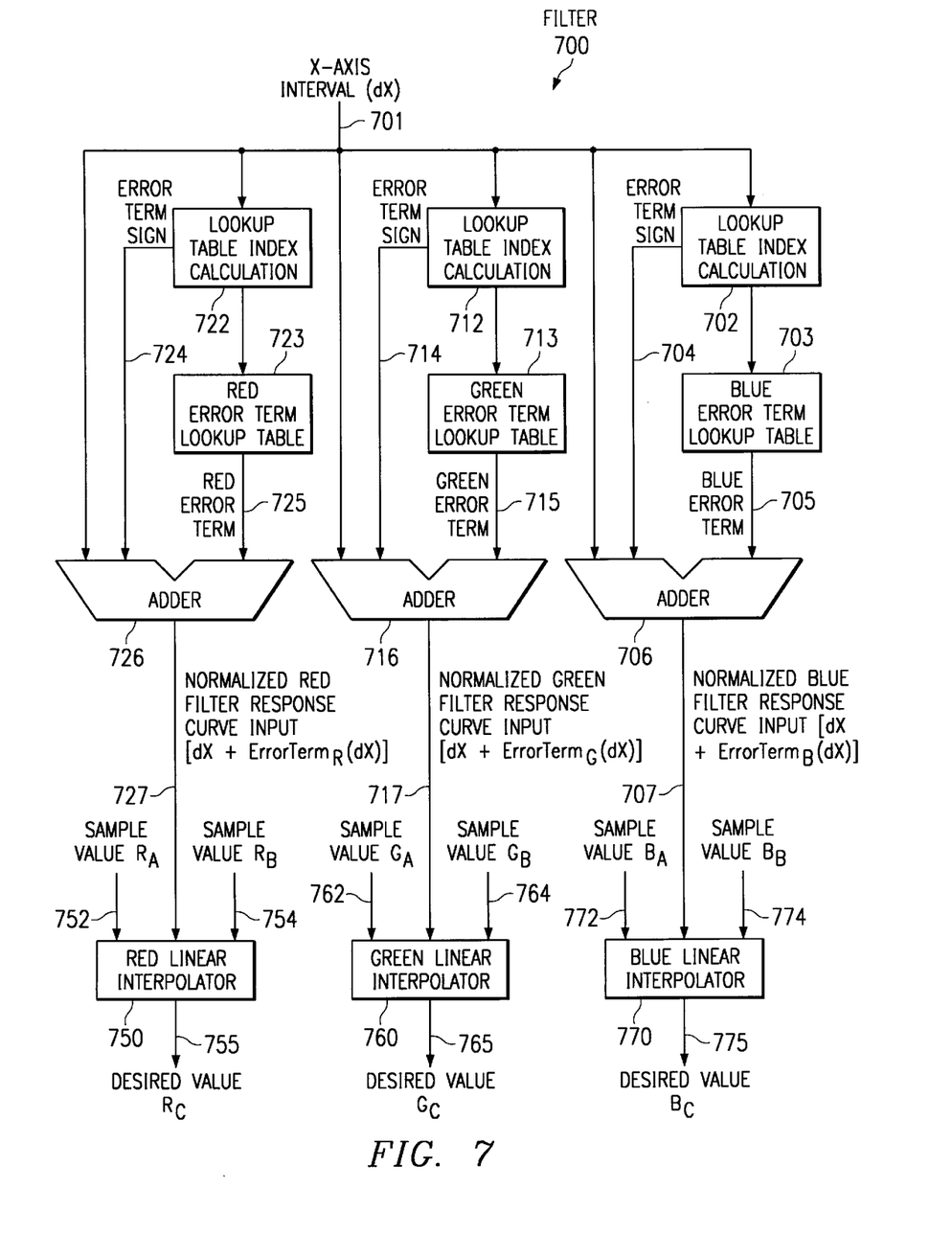
FIG. 7 is a block diagram showing components that may be used to compute a filtered result for a desired pixel from RGB values of sample pixels using multiple filter response curves in accordance with the present invention.

With reference now to FIG. 7, a block diagram shows components that may be used to compute a filtered result for a desired pixel from RGB values of sample pixels using multiple filter response curves in accordance with the present invention. Filter 700 may be present in a graphics subsystem or graphics adapter, such as graphics adapter 268 shown in FIG. 2B. Filter 700 is similar to filter 600 shown in FIG. 6 except that filter 700 operates on multiple characteristic values for a desired pixel using multiple filter response curves. Filter 700 accepts x-axis interval (dX) 701 and RGB values for sample pixel $P_A$ and sample pixel $P_B$ as inputs.

X-axis interval 701 feeds lookup table index calculation 702 for computing an index into blue error term lookup table 703. Error term sign 704 is output from lookup table index calculation 702 as a byproduct of the determination of the relationship between x-axis interval 701 and a normalized midpoint value (0.5) between the two sample values. Blue error term 705 is retrieved from blue error term lookup table 703 according to the computed lookup table index. X-axis interval 701, blue error term 705, and error term sign 704 are fed into adder 706, which computes the normalized blue filter response curve input [dX+ErrorTerm$_B$(dX)] value 707, which is fed into linear interpolator 770.

X-axis interval 701 feeds lookup table index calculation 712 for computing an index into blue error term lookup table 713. Error term sign 714 is output from lookup table index calculation 712 as a byproduct of the determination of the relationship between x-axis interval 701 and a normalized midpoint value (0.5) between the two sample values. Green error term 715 is retrieved from green error term lookup table 713 according to the computed lookup table index. X-axis interval 701, green error term 715, and error term sign 714 are fed into adder 716, which computes the normalized green filter response curve input [dX+ErrorTerm$_G$(dX)] value 717, which is fed into linear interpolator 760.

X-axis interval 701 feeds lookup table index calculation 722 for computing an index into red error term lookup table 723. Error term sign 724 is output from lookup table index calculation 722 as a byproduct of the determination of the relationship between x-axis interval 701 and a normalized midpoint value (0.5) between the two sample values. Red error term 725 is retrieved from red error term lookup table 723 according to the computed lookup table index. X-axis interval 701, red error term 725, and error term sign 724 are fed into adder 726, which computes the normalized red filter response curve input [dX+ErrorTerm$_R$(dX)] value 727, which is fed into linear interpolator 750.

Red linear interpolator 750 accepts normalized red filter response curve input value 727 and sample value $R_A$ 752 and sample value $R_B$ 754, the red component of the color values of sample pixel $P_A$ and sample pixel $P_B$, to generate desired value $R_C$ 755, the red component of the color value of desired pixel $P_C$. Green linear interpolator 760 accepts normalized filter response curve input value 717 and sample value $G_A$ 762 and sample value $G_B$ 764, the green component of the color values of sample pixel $P_A$ and sample pixel $P_B$, to generate desired value $G_C$ 765, the green component of the color value of desired pixel $P_C$. Blue linear interpolator 770 accepts normalized blue filter response curve input value 707 and sample value $B_A$ 772 and sample value $B_B$ 774, the blue component of the color values of sample pixel $P_A$ and sample pixel $P_B$, to generate desired value $B_C$ 775, the blue component of the color value of desired pixel $P_C$. In this manner, the red, green, and blue components of the color value for the desired pixel may be computed in parallel using multiple filter response curves with associated error terms stored in multiple lookup tables.

The advantages of the present invention should be apparent to one of ordinary skill in the art in view of the detailed description of the invention provided above. Previous solutions for filter functions were more computationally expensive. By utilizing an error term for a linear equation and storing the error terms within a lookup table, the present invention is able to significantly enhance the performance of the filter function while maintaining acceptable image quality by producing filter response curve values close to the desired filter function values.

It is important to note that while the present invention has been described in the context of a fully functioning data processing system, those of ordinary skill in the art will appreciate that the processes of the present invention are capable of being distributed in the form of a computer readable medium with instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications link. In particular, the improved filter computation of the present invention may be implemented in instructions embodied on a computer readable medium.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of computing a characteristic value of an output pixel based on characteristic values of a plurality of input pixels, the method comprising the computer-implemented steps of:

obtaining a filter response curve adjustment value based on a distance interval between coordinates of the output pixel and coordinates of a selected input pixel;

computing a normalized filter response curve input value based on the distance interval and the filter response curve adjustment value;

obtaining characteristic values at a plurality of input pixels;

computing a linearly interpolated value for the characteristic value of the output pixel based on the characteristic values of the plurality of input pixels; and adjusting the linearly interpolated value by an error term based on the normalized filter response curve input value.

2. A method of computing a characteristic value of an output pixel based on characteristic values of a plurality of input pixels, the method comprising the computer-implemented steps of:

obtaining a filter response curve adjustment value based on a distance interval between coordinates of the output pixel and coordinates of a selected input pixel;

computing a normalized filter response curve input value based on the distance interval and the filter response curve adjustment value;

obtaining characteristic values at a plurality of input pixels; and computing a linearly interpolated value for the characteristic value of the output pixel based on the characteristic values of the plurality of input pixels and the normalized filter response curve input value;

computing coordinates for the output pixel; and computing the distance interval between coordinates of the output pixel and coordinates of the selected input pixel.

3. The method of claim 1 wherein the filter response curve adjustment value is retrieved from a lookup table based on the distance interval.

4. A method of computing a characteristic value of an output pixel based on characteristic values of a plurality of input pixels, the method comprising the computer-implemented steps of:

obtaining a filter response curve adjustment value based on a distance interval between coordinates of the output pixel and coordinates of a selected input pixel;

computing a normalized filter response curve input value based on the distance interval and the filter response curve adjustment value;

obtaining characteristic values at a plurality of input pixels; and computing a linearly interpolated value for the characteristic value of the output pixel based on the characteristic values of the plurality of input pixels and the normalized filter response curve input value, wherein the filter response curve adjustment value is retrieved from a lookup table based on the distance interval, and wherein the lookup table contains a difference between a value, at a particular coordinate, of a filter function between a plurality of input pixels and a value of a linear equation between a plurality of input pixels.

5. The method of claim 1 wherein the normalized filter response curve input value is computed by adding the distance interval and the filter response curve adjustment value.

6. The method of claim 1 wherein the linearly interpolated value for the characteristic value of the output pixel is computed by multiplying the normalized filter response curve input value by a difference in the characteristic values of the plurality of input pixels and adding a characteristic value of the selected input pixel.

7. The method of claim 1 wherein a characteristic value of a pixel is a color value of a pixel.

8. The method of claim 1 further comprising:

computing a plurality of characteristic values for the output pixel based upon a plurality of characteristic values of the input pixels.

9. The method of claim 8 wherein a computation for each characteristic value of the plurality of characteristic values for the output pixel employs a separate lookup table representing a separate filter function for each characteristic value of a pixel.

10. A data processing system for computing a characteristic value of an output pixel based on characteristic values of a plurality of input pixels, the data processing system comprising:

first obtaining means for obtaining a filter response curve adjustment value based on a distance interval between coordinates of the output pixel and coordinates of a selected input pixel;

first computing means computing means for computing a normalized filter response curve input value based on the distance interval and the filter response curve adjustment value;

second obtaining means for obtaining characteristic values at a plurality of input pixels;

second computing means for computing a linearly interpolated value for the characteristic value of the output pixel based on the characteristic values of the plurality of input pixels; and first adjusting means for adjusting the linearly interpolated value by an error term based on the normalized filter response curve input value.

11. A data processing system for computing a characteristic value of an output pixel based on characteristic values of a plurality of input pixels, the data processing system comprising:

first obtaining means for obtaining a filter response curve adjustment value based on a distance interval between coordinates of the output pixel and coordinates of a selected input pixel;

first computing means computing means for computing a normalized filter response curve input value based on the distance interval and the filter response curve adjustment value;

second obtaining means for obtaining characteristic values at a plurality of input pixels; and second computing means for computing a linearly interpolated value for the characteristic value of the output pixel based on the characteristic values of the plurality of input pixels and the normalized filter response curve input value;

third computing means for computing coordinates for the output pixel; and fourth computing means for computing the distance interval between coordinates of the output pixel and coordinates of the selected input pixel.

12. The data processing system of claim 10 wherein the filter response curve adjustment value is retrieved from a lookup table based on the distance interval.

13. A data processing system for computing a characteristic value of an output pixel based on characteristic values of a plurality of input pixels, the data processing system comprising:

first obtaining means for obtaining a filter response curve adjustment value based on a distance interval between coordinates of the output pixel and coordinates of a selected input pixel;

first computing means computing means for computing a normalized filter response curve input value based on the distance interval and the filter response curve adjustment value;

second obtaining means for obtaining characteristic values at a plurality of input pixels; and second computing means for computing a linearly interpolated value for the characteristic value of the output pixel based on the characteristic values of the plurality of input pixels and the normalized filter response curve input value, wherein the filter response curve adjustment value is retrieved from a lookup table based on the distance interval, and wherein the lookup table contains a difference between a value, at a particular coordinate, of a filter function between a plurality of input pixels and a value of a linear equation between a plurality of input pixels.

14. The data processing system of claim 10 wherein the normalized filter response curve input value is computed by adding the distance interval and the filter response curve adjustment value.

15. The data processing system of claim 10 wherein the linearly interpolated value for the characteristic value of the output pixel is computed by multiplying the normalized filter response curve input value by a difference in the characteristic values of the plurality of input pixels and adding a characteristic value of the selected input pixel.

16. The data processing system of claim 10 wherein a characteristic value of a pixel is a color value of a pixel.

17. The data processing system of claim 10 further comprising:

fifth computing means for computing a plurality of characteristic values for the output pixel based upon a plurality of characteristic values of the input pixels.

18. The data processing system of claim 17 wherein a computation for each characteristic value of the plurality of characteristic values for the output pixel employs a separate lookup table representing a separate filter function for each characteristic value of a pixel.

19. A computer program product in a computer-readable medium for use in a data processing system for computing a characteristic value of an output pixel based on characteristic values of a plurality of input pixels, the computer program product comprising:

first instructions for obtaining a filter response curve adjustment value based on a distance interval between coordinates of the output pixel and coordinates of a selected input pixel;

second instructions for computing a normalized filter response curve input value based on the distance interval and the filter response curve adjustment value;

third instructions for obtaining characteristic values at a plurality of input pixels;

fourth instructions for computing a linearly interpolated value for the characteristic value of the output pixel based on the characteristic values of the plurality of input pixels; and fifth instructions for adjusting the linearly interpolated value by an error term based on the normalized filter response curve input value.

20. A computer program product in a computer-readable medium for use in a data processing system for computing a characteristic value of an output pixel based on characteristic values of a plurality of input pixels, the computer program product comprising:

first instructions for obtaining a filter response curve adjustment value based on a distance interval between coordinates of the output pixel and coordinates of a selected input pixel;

second instructions for computing a normalized filter response curve input value based on the distance interval and the filter response curve adjustment value;

third instructions for obtaining characteristic values at a plurality of input pixels; and fourth instructions for computing a linearly interpolated value for the characteristic value of the output pixel based on the characteristic values of the plurality of input pixels and the normalized filter response curve input value;

instructions for computing coordinates for the output pixel; and instructions for computing the distance interval between coordinates of the output pixel and coordinates of the selected input pixel.

21. The computer program product of claim 19 wherein the filter response curve adjustment value is retrieved from a lookup table based on the distance interval.

22. A computer program product in a computer-readable medium for use in a data processing system for computing a characteristic value of an output pixel based on characteristic values of a plurality of input pixels, the computer program product comprising:

first instructions for obtaining a filter response curve adjustment value based on a distance interval between coordinates of the output pixel and coordinates of a selected input pixel;

second instructions for computing a normalized filter response curve input value based on the distance interval and the filter response curve adjustment value;

third instructions for obtaining characteristic values at a plurality of input pixels; and fourth instructions for computing a linearly interpolated value for the characteristic value of the output pixel based on the characteristic values of the plurality of input pixels and the normalized filter response curve input value, wherein the filter response curve adjustment value is retrieved from a lookup table based on the distance interval, and wherein the lookup table contains a difference between a value, at a particular coordinate, of a filter function between a plurality of input pixels and a value of a linear equation between a plurality of input pixels.

23. The computer program product of claim 19 wherein the normalized filter response curve input value is computed by adding the distance interval and the filter response curve adjustment value.

24. The computer program product of claim 19 wherein the linearly interpolated value for the characteristic value of the output pixel is computed by multiplying the normalized filter response curve input value by a difference in the characteristic values of the plurality of input pixels and adding a characteristic value of the selected input pixel.

25. The computer program product of claim 19 wherein a characteristic value of a pixel is a color value of a pixel.

26. The computer program product of claim 19 further comprising:

instructions for computing a plurality of characteristic values for the output pixel based upon a plurality of characteristic values of the input pixels.

27. The computer program product of claim 26 wherein a computation for each characteristic value of the plurality of characteristic values for the output pixel employs a separate lookup table representing a separate filter function for each characteristic value of a pixel.

* * * * *